(12) United States Patent
Wei

(10) Patent No.: US 10,816,761 B2
(45) Date of Patent: Oct. 27, 2020

(54) LENS MODULE

(71) Applicant: AAC Technologies Pte. Ltd., Singapore (SG)

(72) Inventor: Chuandong Wei, Shenzhen (CN)

(73) Assignee: AAC Optics Solutions Pte. Ltd., Singapore (SG)

(*) Notice: Subject to any disclaimer, the term of this patent is extended or adjusted under 35 U.S.C. 154(b) by 0 days.

(21) Appl. No.: 16/528,686

(22) Filed: Aug. 1, 2019

(65) Prior Publication Data
US 2020/0049952 A1 Feb. 13, 2020

(30) Foreign Application Priority Data
Aug. 8, 2018 (CN) .................. 2018 2 1292119 U

(51) Int. Cl.
H04N 5/225 (2006.01)
G02B 13/00 (2006.01)

(52) U.S. Cl.
CPC ....... G02B 13/0015 (2013.01); H04N 5/2254 (2013.01)

(58) Field of Classification Search
CPC ... G02B 13/0015; G02B 7/022; H04N 5/2254
See application file for complete search history.

(56) References Cited

U.S. PATENT DOCUMENTS 4,110,008 A * 8/1978 Uesugi ............... G02B 7/021 359/825
2013/0050583 A1* 2/2013 Richter ............... H04N 7/102 348/730
2016/0291281 A1* 10/2016 Lamontagne ......... G02B 7/003

* cited by examiner

Primary Examiner — Mekonnen D Dagnew
(74) Attorney, Agent, or Firm — W&G Law Group LLP

(57) ABSTRACT

The present disclosure relates to the field of optical lenses, and discloses a lens module. In the present disclosure, the lens module includes a lens receiving portion having a receiving space, and a lens disposed in the receiving space. The lens receiving portion includes an inner wall around an optical axis of the lens and defining the receiving space, and an outer wall around the optical axis of the lens and disposed opposite to the inner wall. The lens module further includes a buffer member surrounding and being wrapped on at least a part of the outer wall. The lens module provided by the present disclosure is unlikely to be damaged during the assembly process, thereby preventing its performance from being adversely affected.

8 Claims, 6 Drawing Sheets

LENS MODULE

TECHNICAL FIELD

The present disclosure relates to the field of optical lenses, and in particular, to a lens module.

BACKGROUND

In recent years, with the development of science and technology, electronic devices have become more and more intelligent. In addition to a digital camera, portable electronic devices, such as tablet PC and mobile phone, are also equipped with lens modules. In the related art, the lens module generally includes a lens and a lens receiving portion configured to receive the lens.

The inventors have found the following problem in the related art: components are intensively assembled in the electronic device, the components disposed around the lens module in the electronic device may be in hard contact with or even press the lens receiving portion of the lens module when assembling the lens module into the electronic device, which is likely to cause a damage to the lens module and thus affects the performance of the lens module.

BRIEF DESCRIPTION OF THE DRAWINGS

Many aspects of the exemplary embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The present disclosure will be further illustrated with reference to the accompanying drawings and the embodiments.

Figure 1:
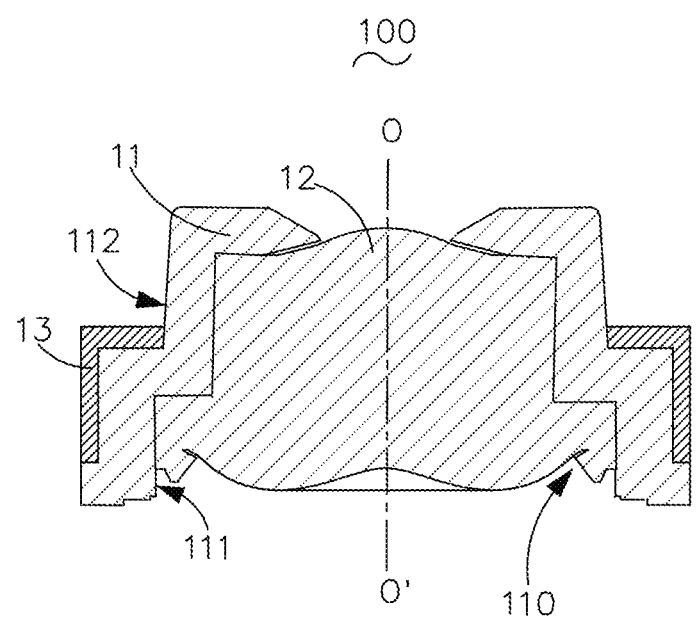
FIG. 1 is a structural cross-sectional view of a lens module according to a first embodiment of the present disclosure.
Figure 2:
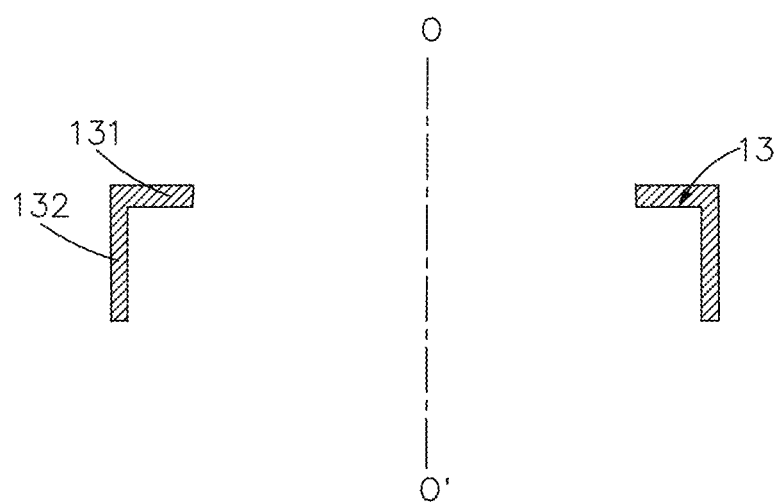
FIG. 2 is a structural cross-sectional view of a buffer member of the lens module according to the first embodiment of the present disclosure.
Figure 3:
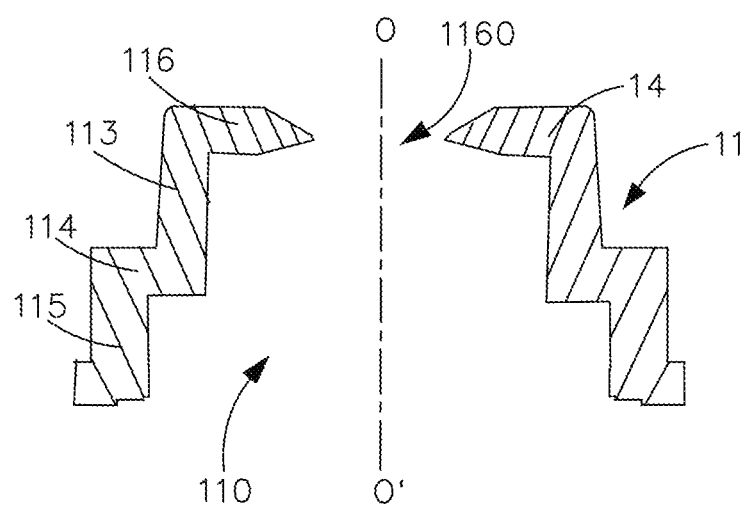
FIG. 3 is a structural cross-sectional view of a lens barrel of the lens module according to the first embodiment of the present disclosure.

A first embodiment of the present disclosure relates to a lens module 100. As shown in FIG. 1 to FIG. 3, the lens module 100 includes a lens receiving portion 11 and a lens 12. The lens receiving portion 11 has a receiving space 110, and the lens 12 is disposed in the receiving space 110. The lens receiving portion 11 further includes an inner wall 111 and an outer wall 112. The inner wall 111 defines the receiving space 110 around an optical axis OO' of the lens 12, and the outer wall 112 is disposed opposite to the inner wall 111 around the optical axis OO' of the lens 12. A buffer member 13 is provided on the outer wall 112.

Compared with the related art, in the embodiment of the present disclosure, the buffer member 13 provided on the outer wall 112 of the lens receiving portion 11 can separate the lens receiving portion 11 from the components provided around the lens module 100 in the electronic device, and by deforming, also can buffer the pressing and collision acting on the lens receiving portion 11, which is caused by the components disposed around the lens module 100 in the electronic device. In this way, the lens module 100 is unlikely to be damaged during the assembly process, thereby preventing the performance of the lens module 100 from being negatively affected. Furthermore, the buffer member 13 may also buffer the vibration of the lens module 100 during use of the electronic device, and thus further protect the lens module 100.

The details of the lens module provided by the present embodiment are specifically described below. The following content is merely intended to facilitate understanding of the details of the embodiment, but not to limit the present disclosure.

For example, the lens receiving portion 11 can include a first barrel wall 113 extending from an object side towards an image side in a direction of the optical axis, a second barrel wall 114 extending from an edge of the first barrel wall 113 close to the image side in a direction perpendicular to and facing away from the optical axis OO', and a third barrel wall 115 extending from an edge of the second barrel wall 114 facing away from the optical axis towards the image side in the direction of the optical axis OO'. That is, with respect to the first barrel wall 113, the second barrel wall 114 and the third barrel wall 115 protrude in a direction facing away from the optical axis OO' and form a step.

The buffer member 13 can cover the second barrel wall 114 and the third barrel wall 115. Since the second barrel wall 114 and the third barrel wall 115 outwardly protrude in the direction facing away from the optical axis OO', they are more likely to subject to interference and collision with the outside objects. In this regard, the lens module can be effectively prevented from being damaged by providing the buffer member 13 to cover the second barrel wall 114 and the third barrel wall 115. For example, the buffer member 13 includes a first side wall 131 extending in the direction perpendicular to and facing away from the optical axis OO', and a second side wall 132 extending from an edge of the first side wall 131 facing away from the optical axis OO' towards the image side in the direction of the optical axis OO'. The first side wall 131 covers the second barrel wall 114, and the second side wall 132 covers the third barrel wall 115.

In the present embodiment, the lens receiving portion 11 is a lens barrel 14 defining the receiving space 110. The lens barrel 14 may further include a fourth barrel wall 116. The fourth barrel wall 116 is provided with a light through hole 1160 and extends from an edge of the first barrel wall 113 close to the object side in a direction perpendicular to the optical axis OO'. The fourth barrel wall 116 defines the light through hole, so that the external light is incident only on an optical portion of the lens for imaging after passing through the light through hole 1160, which prevents the light from being incident and forming stray light on an abutting portion surrounding the optical portion of the lens. In this way, the imaging quality of the lens module 100 would not be affected by the stray light.

It can be understood that the buffer member 13 may be wrapped around the outer wall 112 of the lens receiving portion 11. By directly wrapping the buffer member 13 around the outer wall 112 of the lens receiving portion 11, the buffer member 13 can be fixed to the lens receiving portion 11, which is simple and convenient in operation, thereby saving time and effort.

In an alternative embodiment of the present disclosure, the lens receiving portion 11 and the buffer member 13 may be formed into one piece by injection molding. By forming the buffer member 13 and the lens receiving portion 11 into one piece through injection molding, the buffer member 13 and the lens receiving portion 11 may be fixed more firmly, which is beneficial to improving the reliability of the lens module 100.

It should be noted that the buffer member 13 can be a soft rubber ring. As the soft rubber ring is cheap, the cost can be reduced. In the present embodiment, the soft rubber ring material is made of rubber.

Figure 4:
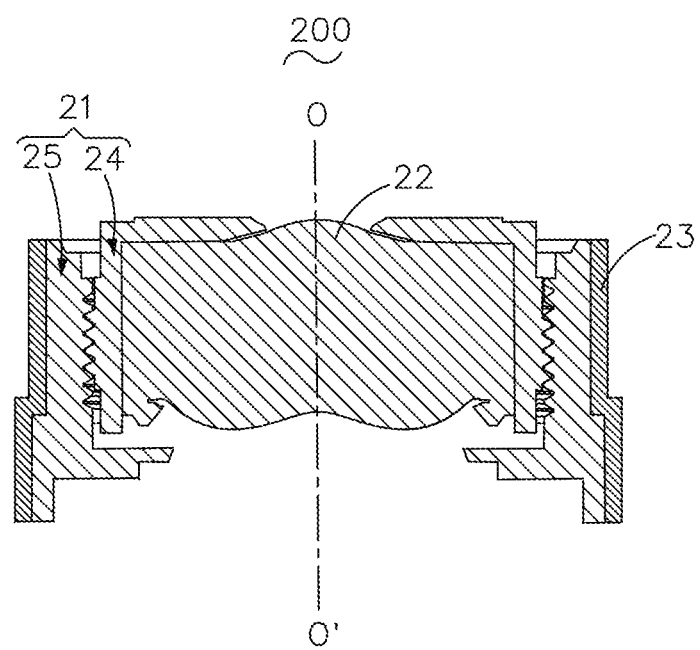
FIG. 4 is a structural cross-sectional view of a lens module according to a second embodiment of the present disclosure.
Figure 5:
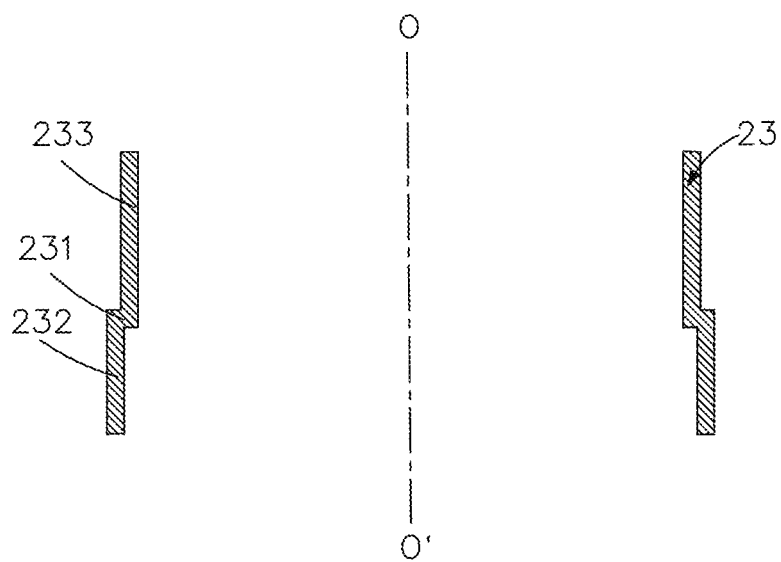
FIG. 5 is a structural cross-sectional view of a buffer member of the lens module according to the second embodiment of the present disclosure.
Figure 6:
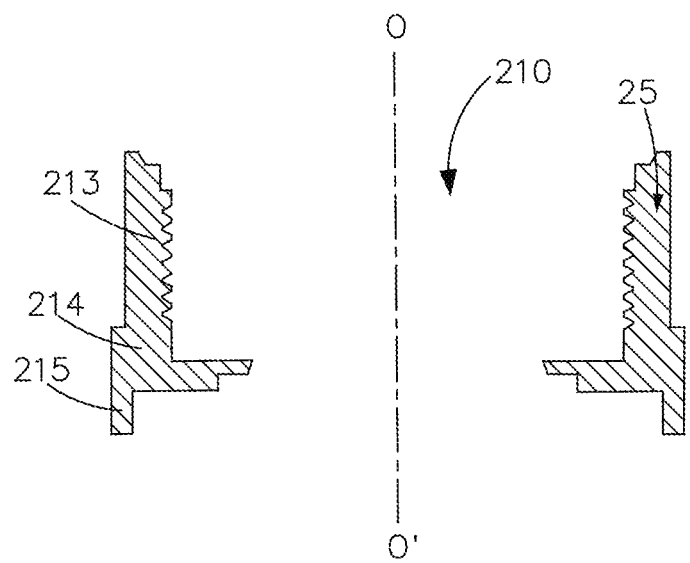
FIG. 6 is a structural cross-sectional view of a lens seat of the lens module according to the second embodiment of the present disclosure.

A second embodiment of the present disclosure relates to a lens module 200. The second embodiment is substantially the same with the first embodiment, and mainly differs from the first embodiment in following aspects. The lens receiving portion 11 in the first embodiment is a lens barrel 14 defining the receiving space 110, while in the second embodiment of the present disclosure, as shown in FIGS. 4-6, the lens module 200 includes a lens receiving portion 21 and a lens 22, and the lens receiving portion 21 includes a lens barrel 24 defining a receiving space 210 and a lens seat 25 receiving the lens barrel 24. The lens seat 25 includes a first barrel wall 213, a second barrel wall 214, and a third barrel wall 215.

That is, the lens module 100 according to the first embodiment is an integrated imaging lens, and includes a lens 12 and a lens barrel 14 for receiving the lens 12, and the lens receiving portion 11 acts as the lens barrel 14. In contrast, the lens module 200 according to the second embodiment is a split imaging lens, and includes a lens 21, a lens barrel 24 receiving the lens 21, and a lens seat 25 receiving the lens barrel, in which the lens seat 25 is provided with a buffer member 23 on its outer wall, and includes a first barrel wall 213, a second barrel wall 214, and a third barrel wall 215.

The buffer member 23 covers the second barrel wall 214 and the third barrel wall 215, and also covers the first barrel wall 213. Compared with merely covering the second barrel wall 114 and the third barrel wall 115 in the buffer member 13 according to the first embodiment, the buffer member 23 according to the present embodiment additionally covers the first barrel wall 213, thereby protecting the lens module to a greater extent, and preventing the performance of the lens module from being adversely affected. For example, in addition to the first side wall 231 and the second side wall 232, the buffer member 23 further includes a third side wall 233 extending from an edge of the first side wall 231 close to the optical axis OO' towards the object side in the direction of the optical axis OO'. The third side wall 233 covers the first barrel wall 213.

It should be understood that the cross-sectional views of the present disclosure are merely illustrative, and aims to show a partial structure in a cross-sectional view. The lens barrel, the lens seat and the like are annular structures, and include more than the portions shown in the drawings.

It should be noted that, the above are merely embodiments of the present invention. Any improvement made by those skilled in the art without departing from the inventive concept of the present invention shall fall within the protection scope of the present invention.

What is claimed is:

1. A lens module, applied in portable electronic devices, comprising:
   a lens receiving portion having a receiving space;
   a lens disposed in the receiving space; and
   a buffer member,
   wherein the lens receiving portion comprises an inner wall around an optical axis of the lens and defining the receiving space, and an outer wall around the optical axis of the lens and disposed opposite to the inner wall,
   the buffer member surrounds and is wrapped on at least a part of the outer wall;
   the lens receiving portion comprises: a first barrel wall extending from an object side towards an image side in a direction of the optical axis; a second barrel wall extending from an edge, close to the image side, of the first barrel wall in a direction perpendicular to and facing away from the optical axis; and a third barrel wall extending from an edge, facing away from the optical axis, of the second barrel wall towards the image side in the direction of the optical axis;
   the buffer member comprises a first side wall extending in the direction perpendicular to and facing away from the optical axis, and a second side wall extending from an edge of the first side wall facing away from the optical axis towards the image side in a direction of the optical axis; and
   the first side wall attaches to and covers the second barrel wall, and the second side wall attaches to and covers the third barrel wall; and
   the buffer has a projection towards the lens, in a direction perpendicular to the optical axis, and the projection covers at least a part of the lens.

2. The lens module as described in claim 1, wherein the lens receiving portion is a lens barrel defining the receiving space, and the lens barrel further comprises a fourth barrel wall, the fourth barrel wall being provided with a light through hole and extending from an edge, close to the object side, of the first barrel wall in a direction perpendicular to the optical axis.

3. The lens module as described in claim 1, wherein the lens receiving portion comprises a lens barrel defining the receiving space and a lens seat receiving the lens barrel, the lens seat comprising a first barrel wall, a second barrel wall, and a third barrel wall.

4. The lens module as described in claim 3, wherein the buffer member further covers the first barrel wall.

5. The lens module as described in claim 1, wherein the buffer member is wrapped on the outer wall of the lens receiving portion.

6. The lens module as described in claim 1, wherein the lens receiving portion and the buffer member are formed into one piece by injection molding.

7. The lens module as described in claim 5, wherein the buffer member is a soft rubber ring.

8. The lens module as described in claim 6, wherein the buffer member is a soft rubber ring.

* * * * *